United States Patent
Nakagawa et al.

(10) Patent No.: US 9,373,851 B2
(45) Date of Patent: Jun. 21, 2016

(54) FUEL CELL

(75) Inventors: Nobuyoshi Nakagawa, Kiryu (JP); Yoshihisa Suda, Fujioka (JP); Koji Nishimura, Fujioka (JP); Kunitaka Yamada, Fujioka (JP); Osamu Shimizu, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 1312 days.

(21) Appl. No.: 12/294,788

(22) PCT Filed: Mar. 20, 2007

(86) PCT No.: PCT/JP2007/055723
§ 371 (c)(1),
(2), (4) Date: Sep. 26, 2008

(87) PCT Pub. No.: WO2007/111201
PCT Pub. Date: Oct. 4, 2007

(65) Prior Publication Data
US 2010/0239942 A1    Sep. 23, 2010

(30) Foreign Application Priority Data
Mar. 27, 2006 (JP) .................. 2006-086418

(51) Int. Cl.
*H01M 8/10* (2006.01)
*H01M 8/02* (2016.01)
*H01M 8/04* (2016.01)

(52) U.S. Cl.
CPC .......... *H01M 8/0239* (2013.01); *H01M 8/0232* (2013.01); *H01M 8/0234* (2013.01);
(Continued)

(58) Field of Classification Search
CPC ............ H01M 8/0239; H01M 8/0232; H01M 8/0234; H01M 8/0236; H01M 8/0245; H01M 8/04186; H01M 8/04201; H01M 8/04208; H01M 8/04261; H01M 8/1009; H01M 8/1011; H01M 8/1013; H01M 2008/1095; Y02E 60/523

USPC ......................................... 429/479
See application file for complete search history.

(56) References Cited

U.S. PATENT DOCUMENTS

2003/0064279 A1*  4/2003  Yoshida et al. .............. 429/44
2006/0251950 A1*  11/2006  Prinz et al. .................. 429/40

FOREIGN PATENT DOCUMENTS

| JP | 5-258760 A | 10/1993 |
| JP | 5-307970 A | 11/1993 |

(Continued)

OTHER PUBLICATIONS

Notification of Transmittal of Translation of the International Preliminary Report on Patentability (Form PCT/IB/338), International Preliminary Report on Patentability (Form PCT/IB/409), mailed in corresponding International Patent Application No. PCT/JP2007/055723, Nov. 27, 2008, The International Bureau of WIPO, Geneva, CH.

(Continued)

*Primary Examiner* — Sarah A Slifka
*Assistant Examiner* — Brent Thomas
(74) *Attorney, Agent, or Firm* — Buchanan, Ingersoll & Rooney PC

(57) ABSTRACT

A fuel cell equipped with at least an air electrode side power collector layer, an air electrode catalyst layer, a polymer electrolyte membrane, a fuel electrode catalyst layer and a fuel electrode side power collector layer and provided with a porous body layer having a porous body at a liquid fuel side of the fuel electrode side power collector layer assumes a structure in which the porous body layer is provided with a gas flow velocity (superficial velocity in the layer) of 10 to 5000 cm/s at a differential pressure of 100 kPa. The porous body layer is a diffusion medium of a fuel into the fuel electrode catalyst layer and a discharge resistor of gases comprising carbon dioxide and steam which are electrode reaction products and a vapor of the liquid fuel in progress of electrode reaction. An interface of the gases and a gases layer are also provided.

7 Claims, 6 Drawing Sheets

(52) U.S. Cl.
CPC ........ *H01M 8/0236* (2013.01); *H01M 8/04186* (2013.01); *H01M 8/04201* (2013.01); *H01M 8/04208* (2013.01); *H01M 8/04261* (2013.01); *H01M 8/1009* (2013.01); *H01M 8/0245* (2013.01); *H01M 8/1011* (2013.01); *H01M 8/1013* (2013.01); *H01M 2008/1095* (2013.01); *Y02E 60/523* (2013.01)

(56) References Cited

FOREIGN PATENT DOCUMENTS

| JP | 6-188008 A | 7/1994 |
|---|---|---|
| JP | 2000-268836 A | 9/2000 |
| JP | 2001-93551 A | 4/2001 |
| JP | 2001-313047 A | 11/2001 |
| JP | 2004-171844 A | 6/2004 |
| JP | 2004171844 A * | 6/2004 |
| JP | 2005-251715 A | 9/2005 |
| JP | 2006-4784 A | 1/2006 |
| JP | 2007-109639 A | 4/2007 |

OTHER PUBLICATIONS

International Search Report (PCT/ISA/210).

Nobuyoshi Nakagawa et al., "Methanol Crossover Controlled by a Porous Carbon Plate as a Support", Electrochemistry, Mar. 5, 2006, pp. 221-225, vol. 74, No. 3.

Mohammad Ali Abdelkareem et al., "DMFC employing a porous plate for an efficient operation at high methanol concentrations", Journal of Power Sources, Nov. 8, 2006, pp. 114-123, vol. 162, Elsevier B.V.

* cited by examiner

FUEL CELL

TECHNICAL FIELD

The present invention relates to a fuel cell operated by using a liquid fuel, more specifically to a fuel cell which can reduce a loss of a fuel caused by crossover, and which can obtain a high output and a high energy density obtained by making use of a high concentration liquid fuel.

BACKGROUND ART

In general, a fuel cell comprises a cell on which an air electrode layer, an electrolyte layer and a fuel electrode layer are laminated, a fuel-supplying part for supplying a fuel as a reducing agent to the fuel electrode layer and an air-supplying part for supplying air as an oxidizing agent to the air electrode layer, and it is an electric cell in which electrochemical reaction takes place between a fuel and oxygen in the air in the cell to bring out an electric power to the outside. Fuel cells of various types are developed.

In recent years, because of a rise in an interest to environmental problems and energy saving, it is studied to use a fuel cell as a clean energy source for various applications. In particular, attentions have been paid to fuel cells which can generate electric power by only supplying directly a liquid fuel comprising methanol and water (refer to, for example, patent documents 1 to 3).

Among them, liquid fuel type fuel cells making use of capillary force for supplying a liquid fuel are known (refer to, for example, patent documents 4 and 5).

Liquid fuel type fuel cells described in the above respective patent documents, so-called passive type fuel cells assume a system in which a fuel is supplied to a power generation cell by virtue of capillary force and in which a pump for supplying a fuel, valves and the like are not required to be provided, so that it is a fuel supplying system which enables to expect an electric generator to be reduced in a size.

In the development of a direct methanol fuel cell as an electric source for small-sized portable appliances, there has been involved a problem of "methanol-crossover" in which methanol is transmitted through an electrolyte membrane as it is unreacted to bring about a loss of a fuel and reduction in electrode performances. As a result, a concentration of the fuel used is reduced to 1 to 3 M (mol/liter), and energy density of the fuel cell system is reduced as well to a large extent as compared with the theoretical value (4800 Wh/liter).

Countermeasures on systems such as development of an electrolyte having a low methanol-crossover and supply of high concentration methanol to an electrode after it is diluted with water to control a concentration have so far been employed as a measure for solving the above problem.

However, it is the existing situation in the former case that in the development of the electrolyte having a low methanol-crossover, a practical membrane making use of high concentration methanol of 10 M or more has not yet been found. On the other hand, in the latter case where a fuel is prepared by diluting high concentration methanol with water, the system is complicated since a methanol concentration sensor, a diluting device, an alcohol tank provided in combination with a water tank and the like are required, and involved therein is the problem that the system capacity grows larger in proportion thereto to reduce energy density in the whole equipment.

On the other hand, the present inventors proposed a fuel cell in which a porous carbon plate is used for a support, a power collector, a liquid supply and gas discharge medium, wherein capillary force of the porous carbon plate is used (refer to, for example, patent document 6).

The fuel cell of the above structure has characteristics and performances which have not so far been observed, but local unevenness is produced in discharge resistance when the produced carbon dioxide passes through the porous body from the electrode surface in power generation. Further, there is a part in which a methanol fuel in the form of a liquid is brought into contact with the electrode membrane, so that methanol-crossover can not be reduced to a large extent in a certain case when using a liquid fuel such as methanol having a high concentration exceeding 10 mol/L and the like, resulting in small output. Therefore, it involves some problem that large output can not be obtained.

Patent document 1: Japanese Patent Application Laid-Open No. 258760/1993 (claims, examples and others)
Patent document 2: Japanese Patent Application Laid-Open No. 307970/1993 (claims, examples and others)
Patent document 3: Japanese Patent Application Laid-Open No. 313047/2001 (claims, examples and others)
Patent document 4: Japanese Patent Application Laid-Open No. 188008/1994 (claims, examples and others)
Patent document 5: Japanese Patent Application Laid-Open No. 93551/2001 (claims, examples and others)
Patent document 6: Japanese Patent Application Laid-Open No. 251715/2005 (claims, examples and others)

DISCLOSURE OF THE INVENTION

Problems to be Solved by the Invention

In light of the problems and the existing situation in the conventional fuel cells described above, the present invention has been made in order to solve them, and an object thereof is to provide a fuel cell in which a loss of a liquid fuel brought about by crossover is prevented and in which a high output and a high energy density can be exhibited by making use of a high concentration liquid fuel.

Means for Solving the Problems

Intensive studies on the above conventional problems repeated by the present inventors have resulted in successfully obtaining a fuel cell meeting the object described above which is equipped with at least an air electrode catalyst layer, an air electrode side power collector layer, a polymer electrolyte membrane, a fuel electrode catalyst layer and a fuel electrode side power collector layer and which is provided with a porous body layer comprising a porous body at a liquid fuel side of the fuel electrode side power collector layer, wherein the porous body layer and the fuel electrode side power collector layer assume specific structures, and thus the present invention has come to be completed.

That is, the present invention comprises the following items (1) to (8).

(1) A fuel cell equipped with at least an air electrode side power collector layer, an air electrode catalyst layer, a polymer electrolyte membrane, a fuel electrode catalyst layer and a fuel electrode side power collector layer and provided with a porous body layer comprising a porous body at a liquid fuel side of the fuel electrode side power collector layer, wherein the porous body layer has a gas flow velocity (superficial velocity in the layer) of 10 to 5000 cm/s at a differential pressure of 100 kPa and is a diffusion medium of a fuel into the fuel electrode catalyst layer and a discharge resistor of gases comprising carbon dioxide and steam which are electrode reaction products and a vapor of the liquid fuel in progress of electrode reaction; an interface of the gases is formed in the porous body layer or on the surface of the porous body layer in progress of electrode reaction, and a gases layer comprising the gases is formed between the fuel electrode catalyst layer and the porous body layer.

(2) The fuel cell as described in the above item (1), wherein the porous body layer has a gas flow velocity (superficial velocity in the layer) of 10 to 1000 cm/s at a differential pressure of 100 kPa.

(3) The fuel cell as described in the above item (1) or (2), wherein the fuel electrode side power collector layer is constituted from a power collector plate on which through-holes are formed.

(4) The fuel cell as described in any of the above items (1) to (3), wherein a closed space layer is provided between the porous body layer and the fuel electrode side power collector layer.

(5) The fuel cell as described in any of the above items (1) to (4), wherein the porous body layer is constituted from at least one material of carbon materials, glass materials, ceramics materials, polymer materials and metal materials.

(6) The fuel cell as described in the above item (5), wherein the porous body layer is constituted from a carbon material or a ceramics material.

(7) The fuel cell as described in any of the above items (1) to (6), wherein the liquid fuel is dialkyl ethers, alcohols or an aqueous solution thereof.

(8) The fuel cell as described in the above item (7), wherein the liquid fuel has an alcohol concentration of 10 wt % or more.

Effects of the Invention

According to the present invention, provided is a fuel cell assuming a structure wherein the porous body layer has a gas flow velocity (superficial velocity in the layer) of 10 to 5000 cm/s at a differential pressure of 100 kPa, and it is a diffusion medium of a fuel into the fuel electrode catalyst layer and a discharge resistor of gases comprising carbon dioxide and steam which are electrode reaction products and a vapor of the liquid fuel in progress of electrode reaction; an interface of the above gases is formed in the porous body layer or on the surface of the porous body layer in progress of electrode reaction, and a gases layer comprising the gases is formed between the fuel electrode catalyst layer and the porous body layer; accordingly, a permeating speed of a liquid fuel and water from an outside of the porous body layer is reduced to prevent a loss of the liquid fuel caused by crossover, and a high output and a high energy density can be exhibited by making use of a high concentration liquid fuel.

EXPLANATION OF SYMBOLS

Figure 1A:
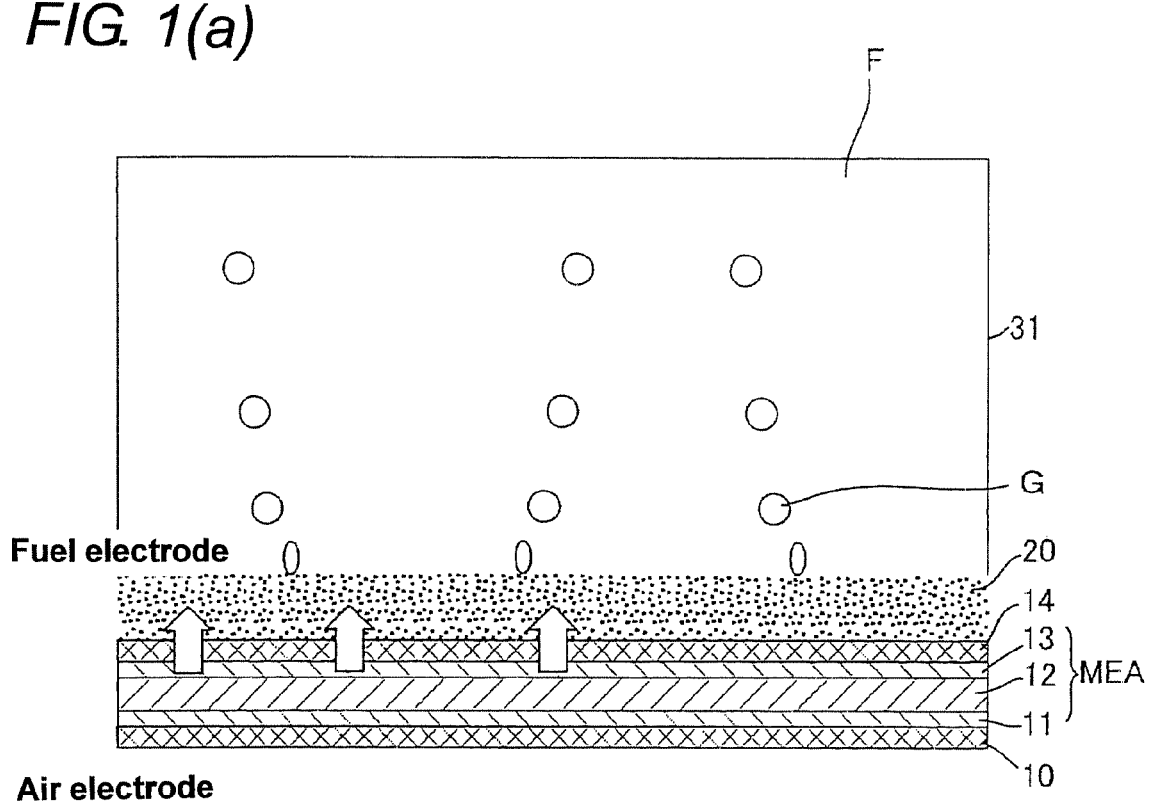
FIG. 1 (a) is a vertical cross-sectional drawing showing an essential part in the embodiment of a fuel cell of the present invention, and (b) is a partially enlarged cross-sectional drawing of (a).

A Fuel cell
10 Air electrode side power collector layer
11 Air electrode catalyst layer
12 Polymer electrolyte membrane
13 Fuel electrode catalyst layer
14 Fuel electrode side power collector layer
20 Porous body layer
30 Holder

BEST MODE FOR CARRYING OUT THE INVENTION

The embodiments of the present invention shall be explained below in details with reference to the drawings.

Figure 1B:
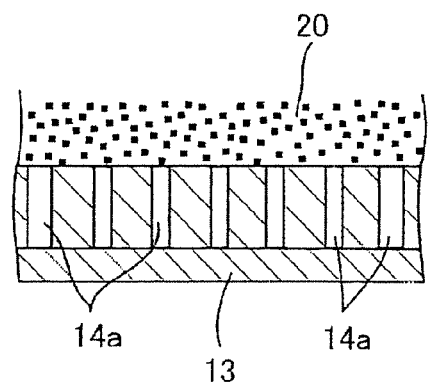
Figure 2A:
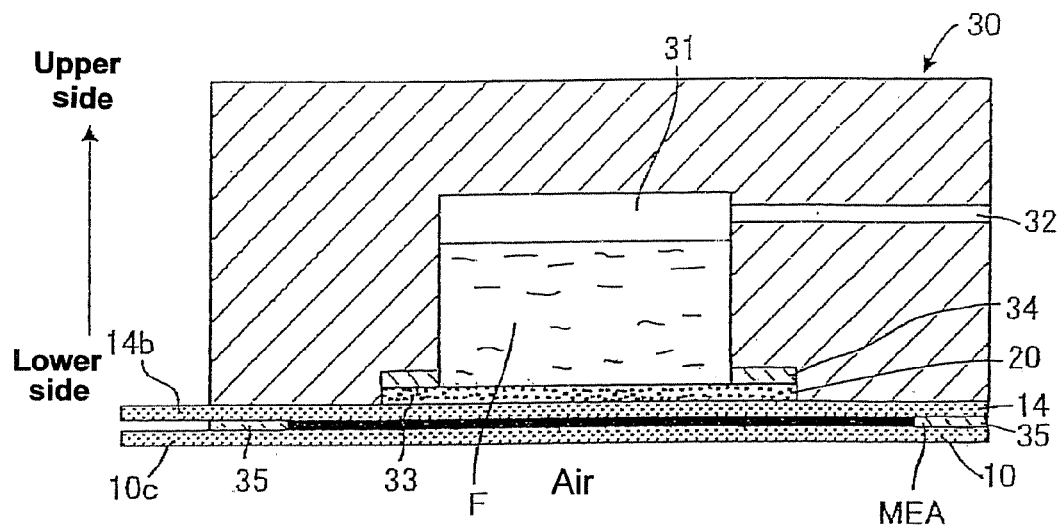
FIG. 2 (a) is a vertical cross-sectional drawing showing the whole part in an embodiment of the fuel cell of the present invention, and (b) is a bottom face drawing of (a).
Figure 2B:
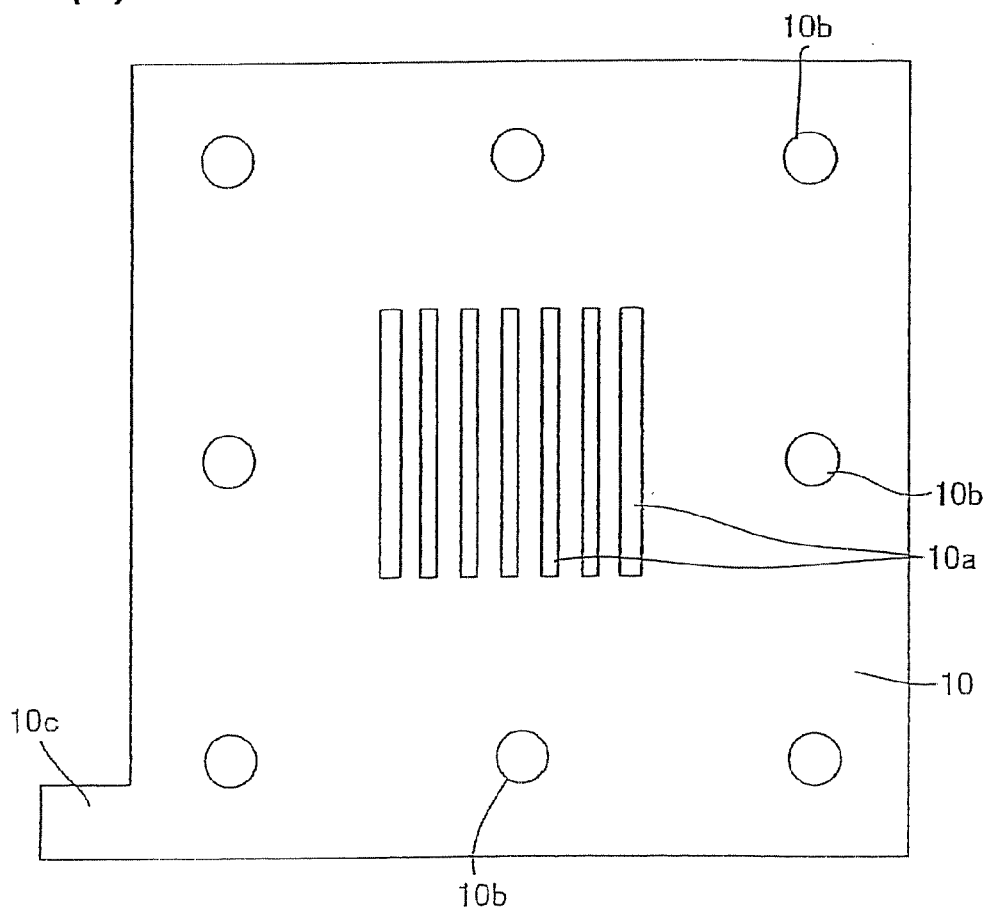
Figure 3:
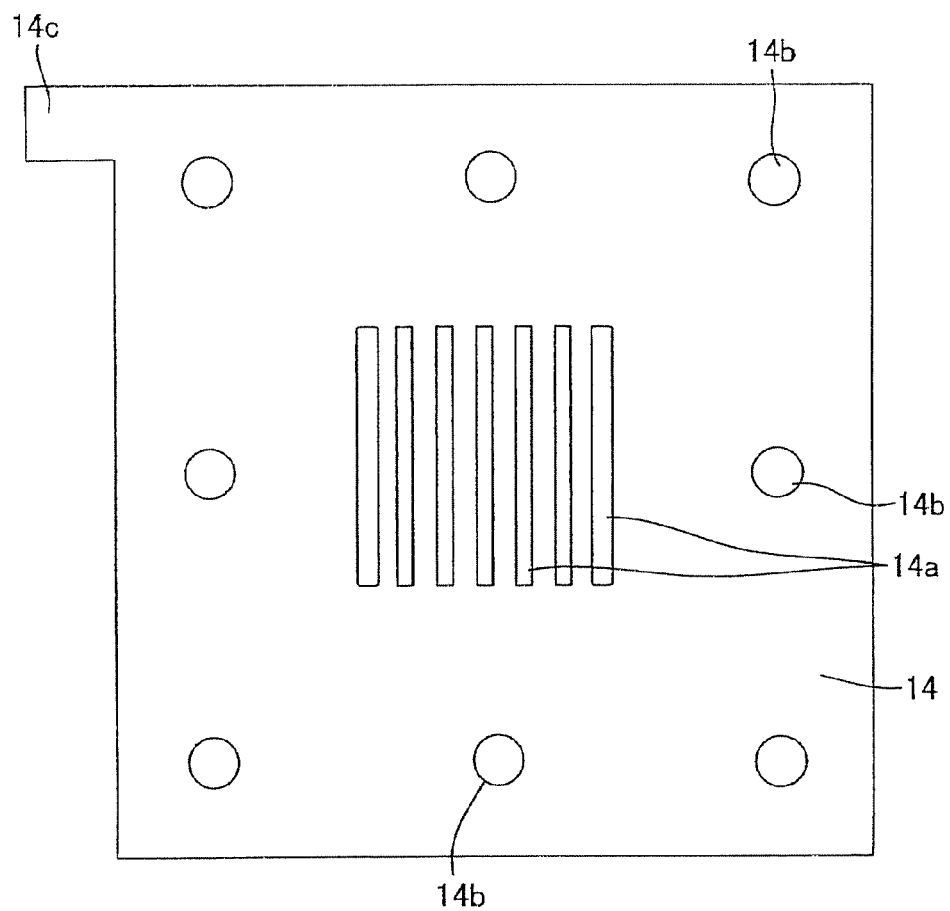
FIG. 3 is a bottom face drawing of a fuel electrode side power collector layer of the present invention.

FIG. 1 to FIG. 3 show the fuel cell A showing an embodiment of the present invention.

The fuel cell A showing the embodiment of the present invention is equipped, as shown in FIG. 1 and FIG. 2, with at least an air electrode side power collector layer 10, an air electrode catalyst layer 11, a polymer electrolyte membrane 12, a fuel electrode catalyst layer 13 and a fuel electrode side power collector layer 14 and provided with a porous body layer 20 comprising a porous body at a liquid fuel side of the fuel electrode side power collector layer 14, and in which they are mounted in a holder 30 for storing a liquid fuel.

The air electrode side power collector layer 10 is a power collector layer disposed at an air electrode side, and it is constituted from a power collector plate made of stainless, titanium and a metal such as brass or copper which is subjected the surface to corrosion resistant electroconductive plating treatment with gold, platinum, nickel and the like. Slit-like opening parts 10a, 10a—for gas flow and housing holes 10b, 10b—are formed, as shown in FIG. 2 (b), in the air electrode side power collector layer 10, and an air electrode terminal 10c is provided at a corner thereof. The slit-like opening parts 10a, 10a—for gas flow described above are constituted from five slit-like opening parts having a width of 2 mm at an interval of 1 mm and two slit-like opening parts having a width of 3 mm provided at both outer sides thereof. In the present embodiment, the air electrode side power collector layer is constituted from a stainless steel plate (SUS 303) having a thickness of 2 mm.

The air electrode catalyst layer 11 is prepared, for example, by carrying platinum (Pt), palladium (Pd), rhodium (Rh) or the like on a sheet-like carbon porous body comprising a porous structure such as a carbon paper by coating.

Ion exchange membranes having proton conductivity or hydroxide ion conductivity, for example, fluorine base ion exchange membranes prepared by using Nafion 112, Nafion 117 (manufactured by Du Pont Inc.) and the like are used for the polymer electrolyte layer 12, and in addition thereto, capable of being used as well are membranes which have heat resistance and in which methanol-crossover is well inhibited, for example, composite membranes prepared by using an inorganic compound for a proton conductive material and using a polymer for a membrane material, to be specific, composite membranes prepared by using zeolite as the inorganic compound and using a styrene-butadiene base rubber as the polymer, hydrocarbon base graft membranes and the like.

The fuel electrode catalyst layer 13 is prepared, for example, by carrying a platinum-ruthenium (Pt—Ru) catalyst, an iridium-ruthenium (Ir—Ru) catalyst, a platinum-tin (Pt—Sn) catalyst or the like on a sheet-like carbon porous body comprising a porous structure such as a carbon paper and a carbon cloth by coating.

The fuel electrode side power collector layer 14 is a power collector layer disposed at a fuel electrode side, and it is constituted from a power collector plate made of metal such as stainless steel and the like. A lot of through-holes 14a, 14a—to be discharge holes for allowing gases comprising carbon dioxide and steam which are electrode reaction products and a vapor of the liquid fuel in progress of electrode reaction (in generating electric current) (hereinafter referred to merely as the gases) to pass through are formed in the above fuel electrode side power collector layer 14, and a fuel electrode terminal 14b is provided at a corner t thereof.

The shape of the above through-holes 14a, 14a—shall not specifically be restricted as long as it is a shape through which the gases pass, and the through holes include through-holes in which opening parts of upper and lower faces of the layer are circular or elliptical, through-holes in which opening parts of upper and lower faces of the layer are rectangular and through-holes in which opening parts of upper and lower faces of the layer have different shapes.

A size of the opening parts in the above through-holes 14a, 14a—is varied according to a size of the fuel cell, the power generation output and the like, and it is preferably 0.05 to 10 mm. Further, a proportion occupied by the through-holes 14a, 14a—is preferably 5 to 99% based on the whole volume of the above fuel electrode side power collector layer 14.

A thickness of the fuel electrode side power collector layer 14 in which the through-holes 14a, 14a—are formed is preferably 0.05 to 5 mm from the viewpoints of forming and holding the gases layer and reduction in a size of the apparatus.

In the present embodiment, the fuel electrode side power collector layer 14 is constituted from a stainless steel plate (SUS 303) having a thickness of 2 mm, and formed as shown in FIG. 3 (b) are five slit-like through-holes 14a, 14a—having a width of 2 mm at an interval of 1 mm, as is the case with the air electrode side power collector layer 10, and two slit-like through-holes having a width of 3 mm provided at both outer sides thereof. A size of the whole opening part area is an area of 22 mm×22 mm so that it is overlapped on the catalyst layer (22 mm square), and a proportion occupied by the above through-holes 14a, 14a—is 75% based on the whole opening part area.

The porous body layer 20 comprising a porous body in the present embodiment is disposed at an outside (upper side in FIG. 1 and FIG. 2) of the fuel electrode catalyst layer, and it has a gas flow velocity (superficial velocity in the layer, and hereinafter the gas flow velocity means a superficial velocity in the layer) of 10 to 5000 cm/s at a differential pressure of 100 kPa. It is a diffusion medium of a fuel into the fuel electrode catalyst layer and a discharge resistor of gases comprising carbon dioxide and steam which are electrode reaction products and a vapor of the liquid fuel in progress of electrode reaction. An interface of the above gases is formed in the porous body layer or on the surface of the porous body layer in progress of electrode reaction, and a gases layer comprising the gases is formed between the fuel electrode catalyst layer and the porous body layer.

In the porous body layer 20, the gas flow velocity at a differential pressure of 100 kPa is preferably 10 to 1000 cm/s, more preferably 50 to 1000 cm/s.

If the gas flow velocity at a differential pressure of 100 kPa is less than 10 cm/s, a supplying rate of the fuel to the catalyst layer is reduced, so that the current density can not be increased, and the output density is lowered. On the other hand, if it exceeds 5000 cm/s, the gases layer can not stably be formed, and methanol-crossover is increased, so that methanol solution having a high concentration can not be used. Accordingly, both ranges are not preferred.

In order to constitute the porous body layer 20 in which a gas flow velocity is 10 to 5000 cm/s at a differential pressure of 100 kPa, which is a diffusion medium of a fuel into the fuel electrode catalyst layer and a discharge resistor of gases comprising carbon dioxide and steam corresponding to electrode reaction products and a vapor of the liquid fuel in progress of electrode reaction, in which an interface of the above gases is formed in the porous body layer or on the surface of the porous body layer in progress of electrode reaction and in which a gases layer comprising the gases is formed between the fuel electrode catalyst layer and the porous body layer, a material, a thickness, an average pore diameter, a pore shape, a porosity and a pore inner surface wetting property of the porous body are suitably combined. For example, a thickness of 0.1 to 10 mm, an average pore diameter of 0.1 to 1000 μm, a porosity of 5 to 99% and hydrophobicity on the surface are employed, and as a material, a carbon material, a glass material, a ceramic material, a polymer material such as a fluororesin and a metal material which have been turned into plate-like, cloth-like and a layer filled with fine particles are suitably combined, whereby the porous body layer 20 can be constituted.

Materials used for the porous body layer 20 include, for example, carbon materials, glass materials, ceramic materials, polymer materials such as a fluororesin and metal materials which have been turned into plate-like, cloth-like and a layer filled with fine particles, and porous bodies of inorganic materials such as carbon materials and ceramic materials are preferable from the viewpoint of having corrosion resistance and a dimensional stability.

Specific carbon materials constituting the porous body layer include amorphous carbon, a composite of amorphous carbon and carbon powder, an isotropic high density carbon molded article, a carbon fiber paper-making molded article, an activated carbon molded article and the like, and they are more preferably amorphous carbon and a composite of amorphous carbon and carbon powder from the viewpoints of moldability, a cost and easiness of obtaining the desired physical properties.

Amorphous carbon exhibits a carbonization yield of 5% or more by calcination and is obtained by calcining, for example, at least one raw material selected from thermoplastic resins such as polyvinyl chloride, chlorinated polyvinyl chloride resins, polyacrylonitrile, polyvinyl alcohol, polyvinyl chloride-polyvinyl acetate copolymers and the like, thermosetting resins such as phenol resins, furan resins, imide resins, epoxy resins and the like, natural high molecular substances such as cellulose, gum arabic and the like.

Carbon powder includes, for example, at least one selected from graphite, pitches obtained by further subjecting tar-like substances to dry distillation, carbon fibers, carbon nanotubes and mesocarbon microbeads.

The composite of amorphous carbon and carbon powder described above is obtained, for example, by carbonizing a mixture of 50 to 100 weight % of an amorphous carbon raw material in which a particle diameter is controlled and 0 to 50 weight % of carbon powder based on the total amount at 700° C. or higher in inert atmosphere.

In respect to a production process for the porous body layer 20 of the carbon material described above, the above-mentioned resin particles which are thermally fusible are put in a mold having an optional shape, fused by heating and the like and calcined in an inert atmosphere, or a material obtained by mixing and kneading a resin which is a binder and graphite which is a carbon powder is crushed and pelletized, put in a mold having an optional shape, press-molded and calcined in an inert atmosphere, whereby capable of being produced is the porous body layer in which a gas flow velocity is 10 to 5000 cm/s at a differential pressure of 100 kPa, which is a diffusion medium of a fuel into the fuel electrode catalyst layer and a discharge resistor of gases comprising carbon dioxide and steam corresponding to electrode reaction products and a vapor of a liquid fuel in progress of electrode reaction, in which an interface of the above gases is formed in the porous body layer or on the surface of the porous body layer in progress of electrode reaction and in which a gases layer comprising the gases is formed between the fuel electrode catalyst layer and the porous body layer.

The glass material includes, for example, soft glass, heat resistant glass and the like, and the ceramic material includes, for example, alumina, silica, mullite, zirconia and the like. The polymer material includes, for example, fluororesins, PET resins, polystyrene and the like, and the metal material includes, for example, stainless steel, titanium, nickel and the like.

In respect to a production process for the porous body layer 20 of the glass material described above, the porous body layer can be produced by, for example, sintering and solidifying granular glass. In respect to a production process for the porous body layer 20 of the ceramic material, the porous body layer can be produced by, for example, sintering and solidifying a granular ceramic material. In respect to a production process for the porous body layer 20 of the polymer material, the porous body layer can be produced by, for example, weaving fibrous polymer materials into felts, cloths and fabrics, converting molten polymer materials into foamed materials or sintering and solidifying granular polymer materials. In respect to a production process for the porous body layer 20 of the metal material, the porous body layer can be produced by, for example, laminating a plurality of sheets which are turned into mesh-like by forming a lot of pores on a membrane surface or sintering and solidifying granular metal materials.

The porous body layer 20 of the present embodiment has two kinds of thicknesses of 1 mm or 2 mm, two kinds of average pore diameters of 2 µm or 20 µm and a porosity of 55% and comprises a material of amorphous carbon or a CNT/amorphous carbon composite, and it has gas permeability and strength which is enough to be self-supporting.

The holder 30 has a concave shape in a cross section in which one side is open as shown in FIGS. 2 (a) and (b), and the concave portion is a liquid fuel storing part 31 for storing a liquid fuel F. A liquid fuel injection port/gas discharge port 32 having a cover part is formed in an upper part of the above liquid fuel storing part 31, and a receiving step part 33 for seating the porous body layer 20 is formed in a periphery of an opening face in the storing part 31

The porous body layer 20 is seated in the receiving step part 33 of the holder 30, and then is bonded with a membrane electrode assembly (MEA) which is prepared by bonding the air electrode catalyst layer 11, the polymer electrolyte membrane 12 and the fuel electrode catalyst layer 13 by hot press and which is interposed between the air electrode side power collector layer 10 and the fuel electrode side power collector layer 14. In the present embodiment, fitting members 15, 15—are fitted to housing holes 10b, 10b—which are provided in the air electrode side power collector layer 10, whereby constituted is a fuel cell in which the porous body layer 20 and the air electrode side power collector layer 10 and the fuel electrode side power collector layer 14 between which the membrane electrode assembly is interposed are mounted in the holder 30. Numerals 34, 35 are rubber packings made of silicone rubber.

The material of the holder 30 shall not specifically be restricted as long as it has storage stability and durability against the liquid fuel stored therein and includes, for example, metals such as stainless steel and the like and synthetic resins such as polypropylene, polyethylene, polycarbonate, polyethylene terephthalate (PET) and the like.

The liquid fuel F stored in the liquid fuel storing part 31 described above includes a methanol solution comprising methanol and water, and the liquid fuel shall not specifically be restricted as long as hydrogen supplied as the fuel can be decomposed into a hydrogen ion ($H^+$) and an electron ($e^-$) in the fuel electrode catalyst layer 13. Capable of being used as well are, though depending on the structure of the fuel electrode, liquid fuels having hydrogen sources including, for example, dialkyl ethers such as dimethyl ether (DME, $CH_3OCH_3$) and the like, alcohols such as ethanol and aqueous solutions thereof, formic acid, hydrazine, aqueous ammonia, ethylene glycol, sucrose aqueous solutions, sodium boron hydride aqueous solutions and the like.

Dialkyl ethers such as dimethyl ether (DME) and the like, alcohols such as methanol, ethanol and aqueous solutions thereof are preferred from the viewpoints of a cost, a supplying ability and high reaction activity, and the concentration thereof is preferably 10 wt % or more (to 100 wt %). When a methanol solution is used, the concentration thereof can be 10 wt % or more, 10 to 100 wt % (concentration 100 wt %=24.7 M (mol/L)).

In the present invention, if the porous body layer having the characteristics described above exhibits a gas flow velocity of 10 to 5000 cm/s at a differential pressure of 100 kPa, the fuel cell which can exhibit a high output and a high energy density by making use of a higher concentration liquid fuel is obtained.

In the fuel cell A of the present embodiment thus constituted, the porous body layer 20 has, as shown in FIG. 1 and FIG. 2, a function as a supplying path of the fuel to the fuel electrode catalyst layer 13 and is a discharge resistor of the gases G comprising carbon dioxide and steam which are electrode reaction products and a vapor of the liquid fuel in progress of electrode reaction (in generating electric current) in the membrane electrode assembly (MEA). The porous body layer 20 in progress of electrode reaction assumes a structure in which an interface of the gases comprising the penetrated liquid fuel and gases produced and filled into voids of the porous body is formed in the porous body layer 20 or on the surface of the porous body layer 20, and the gases layer comprising the gases is formed between the fuel electrode catalyst layer 13 and the porous body layer 20; in the present embodiment, the gases layer is formed in the porous body layer 20 and the through-holes 14a, 14a—in the fuel electrode side power collector layer 14; and the gas flow velocity is 10 to 5000 cm/s at a differential pressure of 100 kPa. Formation of the above gases layer and setting of the gas flow velocity range described above make it possible to reduce a permeating rate of the liquid fuel and water from the outside of the porous body layer 20, and therefore obtained is the fuel cell which prevents a loss of the liquid fuel brought about by crossover and which can exhibit a high output and a high energy density by making use of a high concentration liquid fuel, for example, a liquid fuel comprising methanol having a concentration of 100%.

Further, the air electrode side power collector layer 10, the membrane electrode assembly (MEA—the air electrode catalyst layer, the polymer electrolyte layer and the fuel electrode catalyst layer), the fuel electrode side power collector layer 14 and the porous body layer 20 are formed in a plate form, whereby the thickness can be reduced, and therefore the high output fuel cell which can be further reduced in a size is obtained.

In the fuel cell A of the above embodiment, replenishing the liquid fuel from the liquid fuel injection port/gas discharge port 32 makes it possible to readily replenish the liquid fuel and to stably supply the liquid fuel.

Figure 4:
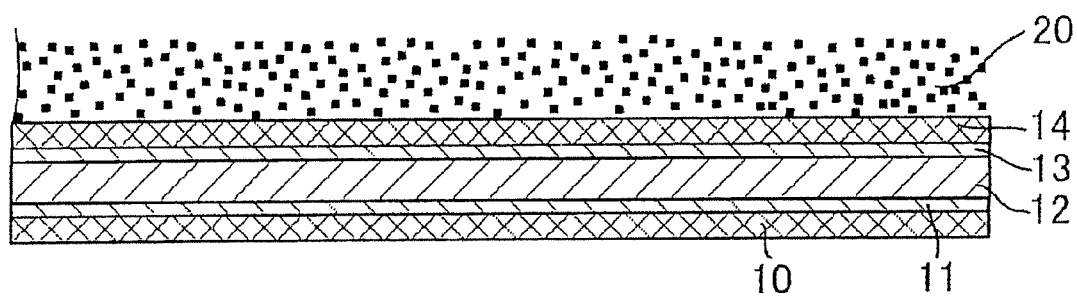
FIG. 4 is a vertical cross-sectional drawing showing an essential part in another embodiment of the fuel cell of the present invention.

FIG. 4 shows another embodiment of a fuel cell of the present invention. The same constitution as those in the embodiment described above shall be shown by the same reference numerals, and explanations thereof shall be abbreviated.

The fuel cell of the present embodiment is different from the fuel cell A of the embodiment described above only in that the fuel electrode side power collector layer 14 is constituted from a power collector plate which is made of a material other than metal such as a carbon cloth, a carbon paper and the like and which has no through holes.

In the fuel cell of the present embodiment, the porous body layer 20 has, as is the case with the embodiment described above, a gas flow velocity of 10 to 5000 cm/s at a differential pressure of 100 kPa and has a function as a diffusion medium of the liquid fuel into the fuel electrode catalyst layer 13, and it is a discharge resistor of the gases G which are electrode reaction products in progress of electrode reaction (in generating electric current) in the membrane electrode assembly (MEA). The porous body layer 20 in progress of electrode reaction assumes a structure in which an interface of the gases comprising the penetrated liquid fuel and gases produced and filled into voids of the porous body is formed in the porous body layer 20 or on the surface of the porous body layer 20, and the gases layer comprising the gases is formed in the porous body layer 20 and in the fuel electrode side power collector layer 14; and the gas flow velocity is 10 to 5000 cm/s at a differential pressure of 100 kPa. Formation of the above gases layer and setting of the gas flow velocity range described above make it possible to reduce a permeating rate of the liquid fuel and water from the outside of the porous body layer 20, and therefore obtained is the fuel cell which prevents a loss of the liquid fuel brought about by crossover and which can exhibit a high output and a high energy density by making use of a high concentration liquid fuel.

Figure 5:
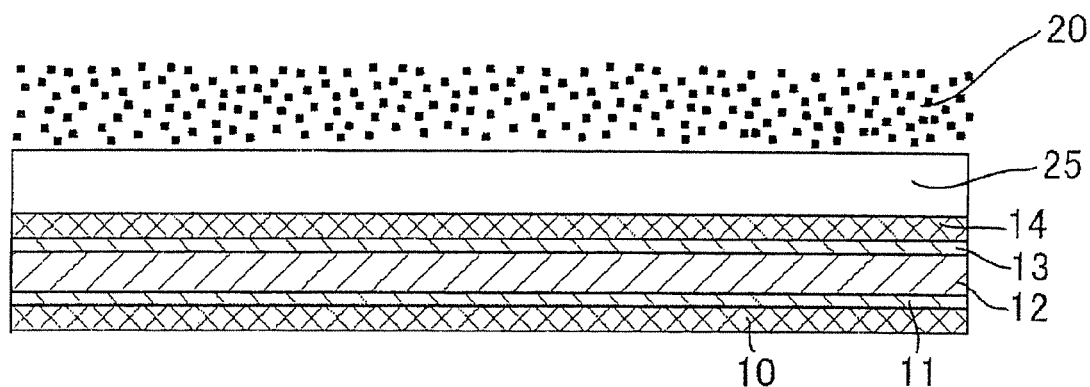
FIG. 5 is a vertical cross-sectional drawing showing an essential part in another embodiment of the fuel cell of the present invention.

FIG. 5 shows another embodiment of a fuel cell of the present invention.

The fuel cell of the present embodiment is different from the fuel cell of the embodiment shown in FIG. 4 described above only in that a closed space layer 25 is provided between the porous body layer 20 and the fuel electrode side power collector layer 14.

A thickness of the closed space layer 25 is preferably 0.05 to 10 mm from the viewpoint of securing a thickness of the gases layer in order to inhibit the crossover.

In the fuel cell of the present embodiment, the porous body layer 20 has, as is the case with the embodiments described above, a gas flow velocity of 10 to 5000 cm/s at a differential pressure of 100 kPa and has a function as a supplying path of the fuel to the fuel electrode catalyst layer 13, and it is a discharge resistor of the gases G which are electrode reaction products in progress of electrode reaction (in generating electric current) in the membrane electrode assembly (MEA). The porous body layer 20 in progress of electrode reaction assumes a structure in which an interface of the gases comprising the penetrated liquid fuel and gases produced and filled into voids of the porous body is formed in the porous body layer 20 or on the surface of the porous body layer 20, and the gases layer comprising the gases is formed between the fuel electrode catalyst layer 13 and the porous body layer 20; in the present embodiment, the gases layer is formed in the porous body layer 20 and in the through-holes 14a, 14a—in the fuel electrode side power collector layer 14; and the gas flow velocity is 10 to 5000 cm/s at a differential pressure of 100 kPa. Formation of the above gases layer and setting of the gas flow velocity range described above make it possible to reduce a permeating rate of the liquid fuel and water from the outside of the porous body layer 20, and therefore obtained is the fuel cell which prevents a loss of the liquid fuel brought about by crossover and which can exhibit a high output and a high energy density by making use of a high concentration liquid fuel.

Also, providing of the above closed space layer 25 makes it possible to increase a diffusion resistance for supplying of the fuel such as methanol and the like from the fuel reservoir 31 to the fuel electrode side catalyst layer 13 while maintaining a gas discharge resistance in the porous body at a constant level.

The fuel cell of the present invention is constituted in the manner described above and displays working effects, but the present invention shall not be restricted to the embodiments described above and can be effectuated as well in various embodiments as long as the scope of the present invention is not altered.

For example, in the embodiments described above, the fuel electrode side catalyst layer 13 has been prepared by coating a catalyst on a carbon paper, but if the porous body layer 20 is electroconductive, the catalyst may be provided directly on the surface of the porous body layer 20 by coating or a plating method, a sputtering method and the like.

EXAMPLES

Next, the present invention shall be explained in further details with reference to examples which are test examples, but the present invention shall not be restricted to the examples described below.

Test Example 1

A direct methanol fuel cell (DMFC) based on FIG. 1 and FIG. 2 was prepared to carry out a power generation test.

A porous body, a membrane electrode assembly (MEA) and others each shown below were used.

Five kinds of porous bodies (S1, S2, Y1, Y2, Y0.2), a ceramic plate (electrolytic diaphragm), a metal foil and a metal plate which were constituted as shown below were obtained by the following respective production methods.

Production Method of Porous Body S1:

A composition comprising furan resin (Hitafuran VF-303, manufactured by Hitachi Chemical Co., Ltd.) 36 weight %, dry distilled pitch (KH-IP, manufactured by Kureha Chemical Industry Co., Ltd.) 14 weight %, a carbon nanotube (VGCF, manufactured by Showa Denko K.K.) and PMMA (particle diameter: 50 μm) 20 weight % was kneaded in a mixer, and the composition was pulverized and classified into powder and then subjected to compression molding by means of a press machine to obtain a molded article.

Next, the molded article was subjected to treatment for making carbon precursor and then calcined at 1000° C. in an inert gas atmosphere to obtain a carbonaceous porous body.

The carbonaceous porous body thus obtained was processed to obtain a carbonaceous porous body having an average pore diameter of 2 μm, a porosity of 51% and a width of 30 mm×a length of 30 mm×a thickness of 1.1 mm.

Production Method of Porous Body S2:

The carbonaceous porous body obtained by production of that of S1 type described above was processed to obtain a carbonaceous porous body having an average pore diameter of 2 μm, a porosity of 51% and a width of 30 mm×a length of 30 mm×a thickness of 2.0 mm. The porous body is different from the S1 type described above only in a thickness.

Production Method of Porous Body Y1:

A chlorinated vinyl chloride resin powder (T-741, manufactured by Nippon Carbide Industries Co., Inc.) was classified in a range of 50 to 300 μm and put into a mold, and then the resin powder was calcined up to 1000° C. in an inert gas atmosphere so that the powder particles were fused to produce a carbonaceous porous body having continuous bubbles.

The carbonaceous porous body thus obtained was processed to obtain a carbonaceous porous body having an average pore diameter of 20 μm, a porosity of 55% and a width of 30 mm×a length of 30 mm×a thickness of 1.0 mm.

Production Method of Porous Bodies Y2 and Y0.2:

The carbonaceous porous body obtained by production of that of the Y1 type described above was processed to obtain a carbonaceous porous body Y2 having an average pore diameter of 20 μm, a porosity of 55% and a width of 30 mm×a length of 30 mm×a thickness of 2.0 mm and a carbonaceous porous body Y0.2 having an average pore diameter of 20 μm, a porosity of 55% and a width of 30 mm×a length of 30 mm×a thickness of 0.2 mm. The above porous bodies are different from the Y1 type described above only in a thickness.

Ceramic Plate:

An electrolytic diaphragm (manufactured by Nikkato Corporation) of porous alumina having an average pore diameter of 0.4 μm and a void function of 0.32; thickness: 2.0 mm Metal Foil:

Pores having a diameter of 80 μm were provided on a nickel foil to be 25% of an aperture ratio, and it was subjected to gold plating. Thickness: 0.008 mm (8 μm).

Metal Plate:

Holes having a diameter of 2 to 4 mm were provided on a stainless steel plate having a thickness of 2.0 mm to be 75% of an aperture ratio, and it was subjected to gold plating.

Five kinds of the porous bodies (S1, S2, Y1, Y2, Y0.2), the ceramic plate (electrolytic diaphragm), the metal foil and the metal plate each obtained above were used to measure gas flow velocity by the following measuring method. These gas flow velocities are shown in the following Table 1.

Measuring Method of the Gas Flow Velocity:

Perm-Porometer (PFC1200AEL, manufactured by Porous Materials U.S.A Inc.) was used to measure the gas flow velocity (air permeating amount) at a pressure loss (differential pressure) of 100 kPa or 10 kPa by a gas flow permeability test.

A blank space (-) in the following Table 1 means that the values fall outside the range of measurement by the apparatus to make the measurement itself impossible.

TABLE 1

| Sample | Thickness (mm) | Gas flow velocity (cm/s) | |
|---|---|---|---|
| | | Differential pressure 100 kPa | Differential pressure 10 kPa |
| Ceramic plate (electrolytic diaphragm) | 2.0 | 0.567 | — |
| Porous body S2 | 2.0 | 33.2 | — |
| Porous body S1 | 1.1 | 66.5 | — |
| Porous body Y2 | 2.1 | 414 | — |
| Porous body Y1 | 1.0 | 816 | — |
| Porous body Y0.2 | 0.2 | 2000 or more | 1148 |
| Metal foil (aperture ratio: 25%) | 0.008 | 4000 or more | 3389 |
| Metal plate (aperture ratio: 75%) | 2.0 | 10000 or more | 8000 or more |

Preparation of Membrane Electrode Assembly (MEA):

Nafion 112 (manufactured by Du Pont Inc.) was used for an electrolyte membrane. With respect to a fuel electrode and an air electrode, a carbon cloth (EC-CC1-060T, manufactured by Toyo Corporation) subjected to water repellent treatment with 30% tetrafluoroethylene (PTFE) was coated with an ink comprising Ketjen black and a Nafion solution and dried; it was coated with a catalyst ink comprising a Pt—Ru black catalyst (HiSPEC 6000 (Pt/Ru Black), manufactured by Johnson Matthey Plc) and a Nafion solution thereon and dried to prepare the fuel electrode and was coated with a catalyst ink comprising a Pt black catalyst (HiSPEC 1000 (Pt Black), manufactured by Johnson Matthey Plc) and a Nafion solution thereon and dried to prepare the air electrode. The details of the catalyst layer of the fuel electrode and the air electrode are shown in the following Table 2.

The electrolyte membrane was interposed between these electrodes and subjected to hot press under the conditions of 135° C., 40 kgf/cm$^2$ and 3 minutes to prepare three kinds of MEA (43×43×0.7 mm).

TABLE 2

| Membrane electrode assembly (MEA) | Electrolyte membrane | Fuel electrode catalyst layer | | Air electrode catalyst layer | | Porous body used |
|---|---|---|---|---|---|---|
| | | Catalyst (Pt-Ru black + Nafion 15 wt %) | Base (Ketjen black + Nafion 10 wt %) | Catalyst (Pt black + Nafion 10 wt %) | Base (Ketjen black + Nafion 10 wt %) | |
| MEA-1 | Nafion 112 | 8.5 mg/cm$^2$ | 2.3 mg/cm$^2$ | 9.0 mg/cm$^2$ | 2.3 mg/cm$^2$ | Porous body Y2 |
| MEA-2 | Nafion 112 | 12 mg/cm$^2$ | 4.0 mg/cm$^2$ | 9.0 mg/cm$^2$ | 3.4 mg/cm$^2$ | Porous body Y1 Porous body Y0.2 |

TABLE 2-continued

| Membrane electrode assembly (MEA) | Electrolyte membrane | Fuel electrode catalyst layer | | Air electrode catalyst layer | | Porous body used |
|---|---|---|---|---|---|---|
| | | Catalyst (Pt-Ru black + Nafion 15 wt %) | Base (Ketjen black + Nafion 10 wt %) | Catalyst (Pt black + Nafion 10 wt %) | Base (Ketjen black + Nafion 10 wt %) | |
| MEA-3 | Nafion 112 | 10 mg/cm$^2$ | 3.6 mg/cm$^2$ | 8.1 mg/cm$^2$ | 3.1 mg/cm$^2$ | Porous body S1 Porous body S2 |

Fuel Electrode Side Powder Collector Layer and Air Electrode Side Powder Collector Layer:

A SUS steel plate in which a size excluding a fuel electrode terminal was 70×70×2 mm was used. Five slit-like through-holes 14a, 14a—having a width of 2 mm and two slit-like through-holes having a width of 3 mm which are provided at both outer sides of the five holes were formed, as shown in FIG. 3, at an interval of 1 mm in an area of 22 mm×22 mm in a central part of the plate surface. A cross-sectional area at an aperture part accounted for 75% based on the whole area of 22 mm×22 mm in the central part of the plate surface.

The carbonaceous porous body described above was mounted in a polycarbonate-made plastic holder having a methanol solution reservoir as shown in FIG. 2, and the carbonaceous porous body was interposed between the fuel electrode of MEA and the fuel solution via the SUS-made power collector plate (thickness: 2 mm) described above in which the through-holes were formed.

In the power generation test, the holder 30 was arranged so that the methanol solution reservoir 31 was positioned in an upper side and the air electrode was positioned in a lower side. The above fuel cell was put in the air at room temperature (20° C.) in all cases to carry out the test.

About 7 ml of the methanol solution having various concentrations was injected into the methanol solution reservoir and left standing for a certain time, and then it was replaced with the methanol solution having a prescribed concentration. Thereafter, a change in a current value with the passage of time at a certain voltage was measured. Also, a weight loss of the whole cell before and after the test was measured on a balance. Further, a concentration of methanol remaining in the methanol solution reservoir was measured by a gas chromatography (GC-14B, manufactured by Shimadzu Corporation) using polyethylene glycol 6000 (C-1389, manufactured by Shinwa Chemical Industries Ltd.) as a column to obtain a change in the concentration before and after the test.

Then, the methanol consumption and the water consumption in the test period were calculated from the results of the weight loss and the change in the concentration. Further, considering the power generation output in the test period in addition to the above results, and assuming that the following reaction equation was effective and that a weight loss caused by gas discharge from the liquid injection/gas discharge port of the holder could be ignored, the methanol permeating flow rate through the electrolyte membrane was calculated.

The electrode reaction equation assumed in the calculation:

$CH_3OH+H_2O \rightarrow CO_2+6H^++6e^-$     fuel electrode $1.5O_2+6H^++6e^- \rightarrow 3H_2O$     air electrode As shown in the foregoing Table 2, carried out were the test of the porous body Y2 using the membrane electrode assembly MEA-1 and, the tests of the porous bodies Y1 and Y0.2 using MEA-2 and the tests of the porous bodies S1 and S2 using MEA-3.

The methanol permeating flow rate was calculated according to the following calculating equation.

| Symbols used [unit] | meaning of symbols used |
|---|---|
| $C_0$ [mol/L] | injection concentration of methanol solution |
| $C_2$ [mol/L] | residual concentration of methanol solution |
| $W_0$ [g] | injection amount of methanol solution |
| $W_2$ [g] | residual amount of methanol solution |
| $\rho_0$ [g/cm$^3$] | density of injected methanol solution |
| $\rho_2$ [g/cm$^3$] | density of residual methanol solution |
| A [cm$^2$] | apparent electrode area (4.84 cm$^2$) |
| $i_{(t)}$ [mA/cm$^2$] | current density at time t |
| t [min] | time |
| $t_F$ [min] | total measuring time |
| $\Delta M_i$ [mol] | amount of methanol converted to electric current |
| $\Delta M_m$ [mol] | total methanol consumption |
| $F_M$ [g/(m$^2$s)] | permeating flux of methanol in membrane (methanol flux) |
| n [—] | number of electrons participating in reaction (= 6) |
| F [C/mol] | Faraday constant (=96485) |

Calculating Formula
Amount of Methanol Converted to Electric Current $$\Delta M_i = (\int_0^{tF} i_{(t)} tA dt)/(nF)$$

Total Methanol Consumption $$\Delta M_m = (C_0 W_0/\rho_0 - C_2 W_2/\rho_2) \times 1000$$

Permeating Flux of Methanol in Membrane $$F_M = (\Delta M_m - \Delta M_i) \times 32 \times 10000/(A t_F \times 60)$$

Test Example 1-1

Figure 6:
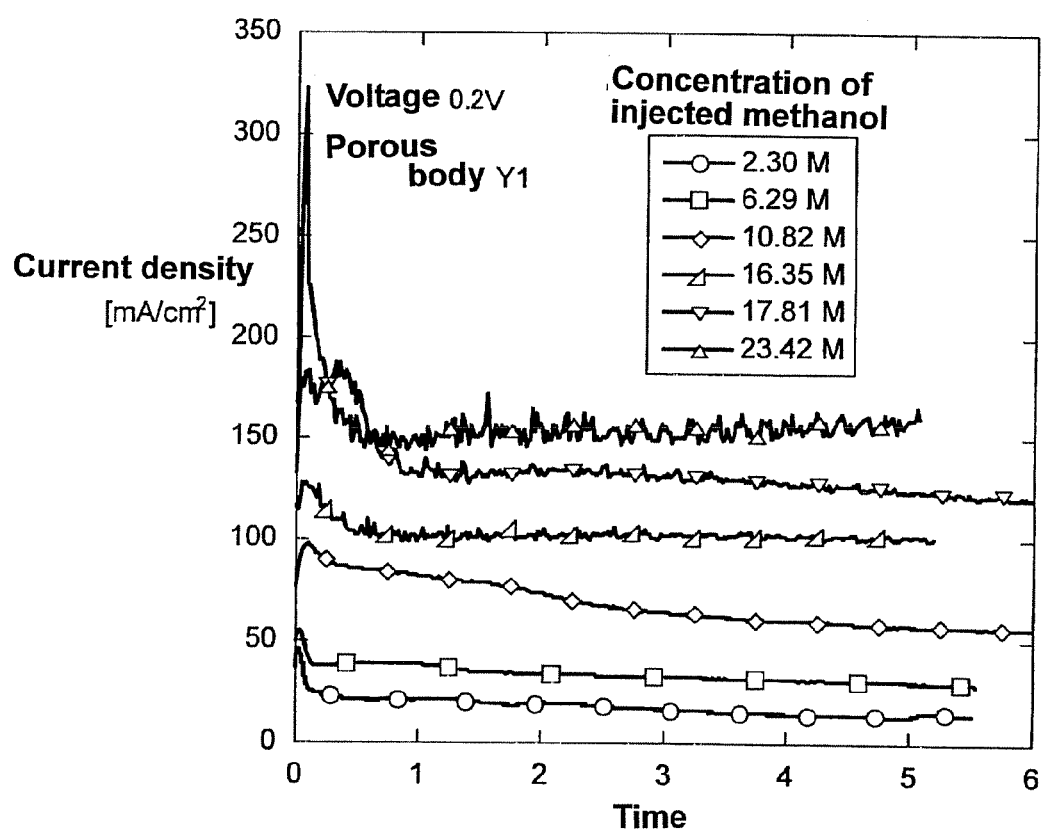
FIG. 6 is a characteristic diagram showing current density relative to time depending on methanol concentrations at a cell voltage of 0.2 V when a porous body Y1 is used to carry out a power generation experiment.

Shown in FIG. 6 is dependency of change in the current density with passage of time onto the methanol concentration (2.30 M to 23.42 M) at a cell voltage of 0.2 V when the porous body Y1 was used to carry out the power generation experiment.

As shown in FIG. 6, the current value was stabilized in about 30 minutes, and almost fixed current value was exhibited since then. The value of the stabilized electric current grew large as the methanol concentration was increased, and it was maximized at a high concentration of 23.42 M (mol/L)=93.5 wt %. It was found that power could stably be generated with a maximum performance at a high concentration close to 100%.

Test Example 1-2

Figure 7:
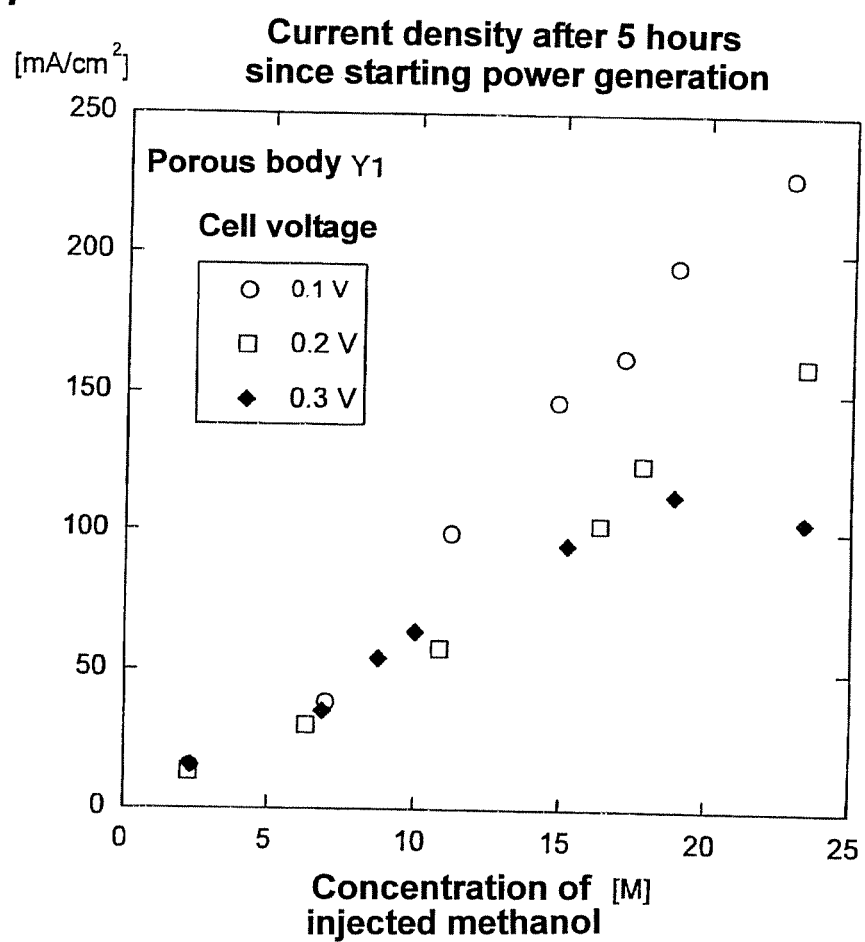
FIG. 7 is a characteristic diagram showing a current value at different voltages (0.1 V, 0.2 V and 0.3 V) relative to a methanol concentration after 5 hours since starting power generation when the porous body Y1 is used to carry out a power generation experiment.

Shown in FIG. 7 is dependency of the current value onto the methanol concentration at different cell voltages (0.1 V, 0.2 V and 0.3 V) after 5 hours since starting power generation when the porous body Y1 was used to carry out the power generation experiment.

As shown in FIG. 7, the current density grew larger at any voltage as a concentration of methanol was increased. At the cell voltages of 0.1 V and 0.2 V, the maximum value was exhibited at about 24 M which was the maximum value of the concentration used. On the other hand, the current density was decreased at a cell voltage of 0.3 V at the concentration exceeding 20 M, and the maximum value was exhibited at a concentration of about 20 M in this case.

Test Example 1-3

Figure 8:
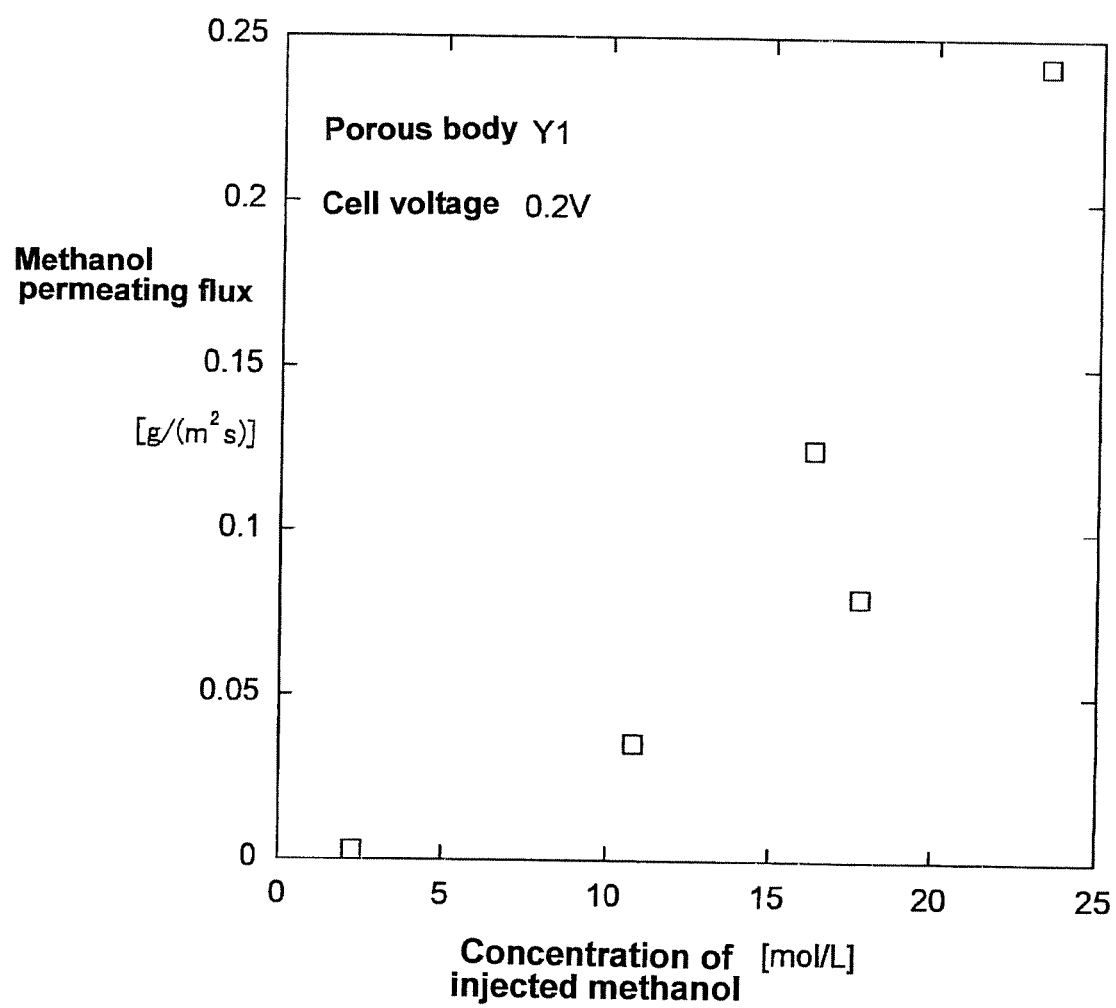
FIG. 8 is a characteristic diagram showing the result of a methanol permeation flux at a cell voltage of 0.2 V when the porous body Y1 is used to carry out a power generation experiment.

The result of a methanol permeating flux obtained when the porous body Y1 was used to carry out the power generation experiment is shown in FIG. 8.

As apparent from the result shown in FIG. 8, the permeating rate grew larger as the methanol concentration was increased. However, it was found that these values were notably small as compare with the permeating rate observed when the gas layer was not formed in the comparative example.

Test Example 1-4

Summarized in the following Table 3 are the qualities (thickness and gas flow velocity) of various porous bodies (S1, S2, Y1, Y2 and Y0.2) and other porous plates, the maximum output values obtained by carrying out the power generation test at a cell voltage of 0.2 V and the methanol concentrations and the methanol permeating rates at which the maximum output values were exhibited.

$mW/cm^2$) are exhibited at the high concentrations. Further, it can be found that the methanol permeating flux in these cases is controlled to a relatively low value of 0.08 to 0.24 $g/(m^2s)$ in spite of the high concentration methanol.

On the other hand, the maximum value was exhibited at a high methanol concentration of 24 M in the ceramic plate in which a gas permeating rate at a differential pressure of 100 kPa was 1 cm/s or less, but in this case, methanol permeation was too strongly inhibited by the porous body (ceramic plate), and therefore the high output density was not obtained (measured value: 6.4 $mW/cm^2$).

Also, it was found that in the case of the metal plate (aperture ratio: 75%) in which a gas permeating rate at a differential pressure of 10 kPa was 8000 cm/s or more, methanol permeation was scarcely inhibited; the concentration at which the maximum output value (4.6 $mW/cm^2$) was exhibited was as small as 4 M; and the methanol permeating rate was as large as 0.41 $g/(m^2s)$.

Further, in the porous body Y0.2 and the metal foil (aperture ratio: 25%) in which a gas permeating rate at a differential pressure of 10 kPa was 1100 to 3300 cm/s, the performances were good as compared with those of the ceramic plate and the metal plate described above, but methanol permeation was weakly inhibited. The concentrations at which the maximum output values were exhibited were as small as 10 M and 17 M, and the outputs were reduced at the concentrations higher than the above value.

It could be confirmed from the above results that the porous body layer in which a gas permeating rate at a differential pressure of 100 kPa was 10 to 1000 cm/s was particularly preferred for obtaining a high output making use of a high concentration close to 100 wt %.

Test Example 1-5

Shown in the following Table 4 are the results obtained by providing transparent acryl-made spacers having a thickness

TABLE 3

Gas flow velocities of various porous bodies and maximum output values and methanol concentrations of DMFC prepared by using the porous bodies

| | | Gas flow velocity (cm/s) | | | Maximum output value and methanol permeating flux of DMFC at a voltage of 0.2 V | | |
|---|---|---|---|---|---|---|---|
| | | | | | Current density | | Methanol |
| Sample | Thickness [mm] | Differential pressure 100 kPa | Differential pressure 10 kPa | Methanol concentration | after 5 hours since starting power generation [$mA/cm^2$] | Output density [$mW/cm^2$] | permeating flux [$g/(m^2s)$] |
| Ceramic plate (electrolytic diaphragm) | 2.0 | 0.567 | — | 24.0 | 32 | 6.4 | 0.02 |
| Porous body S2 | 2.0 | 33.2 | — | 24.0 | 109.5 | 21.9 | 0.08 |
| Porous body S1 | 1.1 | 66.5 | — | 22.2 | 145.3 | 29.06 | 0.093 |
| Porous body Y2 | 2.1 | 414 | — | 24.0 | 78.8 | 15.76 | 0.145 |
| Porous body Y1 | 1.0 | 816 | — | 23.4 | 159.8 | 31.96 | 0.242 |
| Porous body Y0.2 | 0.2 | 2000 or more | 1148 | 17.0 | 121.3 | 24.26 | 0.253 |
| Metal foil (aperture ratio: 25%) | 0.008 | 4000 or more | 3389 | 10.0 | 122 | 24.4 | 0.28 |
| Metal plate (aperture ratio: 75%) | 2.0 | 10000 or more | 8000 or more | 4.0 | 23 | 4.6 | 0.41 |

Observing the results shown in Table 3, the maximum values of the output densities are exhibited at the high methanol concentrations of 22 to 24 M in the case of the porous bodies (S1, S2, Y1 and Y2) in which a gas permeating rate at a differential pressure of 100 kPa falls in a range of 33.2 to 816 cm/s, that is, the high output densities (about 16 to about 32 of 5 mm between an anode power collector plate brought into contact with MEA and the porous plate to visually observe whether or not a space formed between MEA and the porous plate by the spacers was filled with a liquid or a gas during power generation (cell voltage: 0.2 V, methanol concentration at which the maximum output was exhibited).

TABLE 4

Presence of gas layer formation between MEA and porous plate under conditions under which the maximum output density was exhibited when respective porous plates were used

| Sample | Thickness [mm] | Gas flow velocity (cm/s) | | Voltage [V] | Methanol concentration [M] | Presence of gas layer formation between MEA and porous plate* |
|---|---|---|---|---|---|---|
| | | Differential pressure 100 kPa | Differential pressure 10 kPa | | | |
| Ceramic plate (electrolyte diaphragm) | 2.0 | 0.567 | — | 0.2 | 24.0 | presence |
| Porous body S2 | 2.0 | 33.2 | — | 0.2 | 24.0 | presence |
| Porous body S1 | 1.1 | 66.5 | — | 0.2 | 22.2 | presence |
| Porous body Y2 | 2.1 | 414 | — | 0.2 | 24.0 | presence |
| Porous body Y1 | 1.0 | 816 | — | 0.2 | 23.4 | presence |
| Porous body Y0.2 | 0.2 | 2000 or more | 1148 | 0.2 | 17.0 | presence |
| Metal foil (aperture ratio: 25%) | 0.008 | 4000 or more | 3389 | 0.2 | 10.0 | presence |
| Metal plate (aperture ratio: 75%) | 2.0 | 10000 or more | 8000 or more | 0.2 | 4.0 | None |

*Presence of the gas layer between MEA and the porous plate is the result obtained by providing transparent acryl-made spacers having a thickness of 5 mm between an anode power collector plate brought into contact with MEA and the porous plate to visually observe whether or not a space formed between MEA and the porous plate by the spacers was filled with a liquid or a gas The results shown in Table 4 show the followings. In the porous bodies other than the metal plate (aperture rate: 75%) in which a gas permeating rate at a differential pressure of 10 kPa was 8000 cm/s or more, the liquid was not permeated into the space due to mass transfer resistance in the porous body, or if the liquid was present in the space at the beginning, carbon dioxide produced by an anode reaction was filled in the space so that the liquid was transferred to the outside of the porous body to form the gases layer. Also, in the metal plate (aperture rate: 75%) at a differential pressure of 10 kPa, carbon dioxide produced in the anode passed readily through the metal plate in the form of bubbles, and the gases layer was not formed in the space formed by the spacers. As a result, the methanol solution was brought into direct contact with MEA to allow the methanol permeating rate to grow larger, and the methanol permeating rate as high as 0.41 g/(m²s) was observed at a low methanol concentration of 4 M.

Further, in the porous body Y0.2 in which a gas permeating rate at a differential pressure of 10 kPa was 1148 cm/s and the metal foil (aperture ratio: 25%) in which that was 3300 cm/s, when the methanol concentration was further increased from the methanol concentration at which the maximum output was exhibited, a surface tension of the solution was reduced to make the solution liable to penetrate into the spacers, and the gas layer was insufficiently formed, which resulted in allowing the space to be filled soon with the solution.

It was confirmed from the foregoing that the gases layer comprising carbon dioxide as a principal component had to be formed between MEA and the porous plate in order to make use of a high concentration methanol.

Test Example 1-6

Shown in the following Table 5 are the results showing the characteristics (cell voltage: 0.1 to 0.3 V, a current density and an output density obtained after 5 hours since starting power generation) which were obtained by carrying out the power generation test at a methanol concentration of 100 wt % (24.7 M (mol/L)) using the porous bodies S1 and Y2.

TABLE 5

Examples of results in power generation test carried out by using 100% methanol

| Sample | Voltage [V] | Current density* [mA/cm²] | Output density* [mW/cm²] |
|---|---|---|---|
| Porous body S1 | 0.1 | 164.2 | 16.42 |
| | 0.2 | 58.8 | 11.76 |
| | 0.3 | 52.2 | 15.66 |
| Porous body Y2 | 0.1 | 98.1 | 9.81 |
| | 0.2 | 50.4 | 10.08 |
| | 0.3 | 28.8 | 8.64 |

*Values after 5 hours since starting power generation

As apparent from the results shown in Table 5, it could be confirmed that the current density and the output density were stably exhibited at a methanol concentration of 100 wt % (24.7 M (mol/L)) even after 5 hours since starting power generation.

INDUSTRIAL APPLICABILITY

In a polymer electrolyte fuel cell and the like, obtained is a fuel cell which is improved in power generation performances and reduced in a loss of a fuel brought about by crossover and which is reduced in a size.

The invention claimed is:
1. A fuel cell equipped with
at least an air electrode side power collector layer,
an air electrode catalyst layer,
a polymer electrolyte membrane,
a fuel electrode catalyst layer and
a fuel electrode side power collector layer,
and provided with
a porous body layer comprising a porous body at a liquid fuel side of the fuel electrode side power collector layer,
wherein the porous body layer has a gas flow velocity (superficial velocity in the layer) of 10 to 5000 cm/s at a differential pressure of 100 kPa and is a diffusion medium of a fuel into the fuel electrode catalyst layer and a discharge resistor of gases comprising carbon dioxide and steam which are electrode reaction products and a vapor of the liquid fuel in progress of electrode reaction;

an interface of the gases is formed in the porous body layer or on the surface of the porous body layer in progress of electrode reaction, and a gases layer comprising the gases is formed between the fuel electrode catalyst layer and the porous body layer, and further a closed space layer in which a closed space is formed at least at a fuel electrode layer side is provided between the porous body layer and the fuel electrode side power collector layer, the closed space layer having a thickness of 0.05 to 10 mm.

2. The fuel cell as described in claim 1, wherein the porous body layer has a gas flow velocity (superficial velocity in the layer) of 10 to 1000 cm/s at a differential pressure of 100 kPa.

3. The fuel cell as described in claim 1, wherein the fuel electrode side power collector layer is constituted from a power collector plate on which through-holes are formed.

4. The fuel cell as described in claim 1, wherein the porous body layer is constituted from at least one material of carbon materials, glass materials, ceramics materials, polymer materials and metal materials.

5. The fuel cell as described in claim 4, wherein the porous body layer is constituted from a carbon material or a ceramics material.

6. The fuel cell as described in claim 1, wherein the liquid fuel is dialkyl ethers, alcohols or an aqueous solution thereof.

7. The fuel cell as described in claim 6, wherein the liquid fuel has an alcohol concentration of 10 wt % or more.

* * * * *